United States Patent [19]

Hoekstra

[11] Patent Number: 4,491,461
[45] Date of Patent: Jan. 1, 1985

[54] METHOD OF DESULFURIZATION OF FLUE GASES

[76] Inventor: Irenus A. Hoekstra, 906 Woodlyn Dr. North, Cincinnati, Ohio 45230

[21] Appl. No.: 495,243

[22] Filed: May 17, 1983

[51] Int. Cl.$^3$ .................. B01D 19/00; F25J 3/02
[52] U.S. Cl. ............................................. 62/17; 55/44; 55/48; 55/50; 55/55; 55/73; 62/20
[58] Field of Search ............. 62/17, 20; 55/68, 73, 55/23, 40, 44, 48, 49, 50, 57, 89, 55

[56] References Cited

U.S. PATENT DOCUMENTS 4,189,309  2/1980  Hoekstra ........................... 55/73

*Primary Examiner*—Frank Sever
*Attorney, Agent, or Firm*—Bean, Kauffman & Bean

[57] ABSTRACT

Preliminarily cooled flue gases from which particulates and sulfur trioxide have been removed are contacted with an $SO_2$ absorbing liquid and the $SO_2$ laden liquid is then regenerated by multi-stage vacuum stripping and returned in a closed cycle to the absorber. The absorbing liquid contains an additive and is a dilute solution of, preferably, calcium ions in water. The additive is added in minor amount sufficient to provide a partial pressure of $SO_2$ in the absorber equivalent to the partial pressure of $SO_2$ in water in the temperature range of about 15° C. to −20° C. The preliminarily cooled gas is at a temperature in the order of 125° F. The heat removed from the closed cycle by vacuum stripping is substantially equal to the heat given up by the flue gas in the absorber, and the temperature difference between the liquid on entering and leaving the desorber is in the order of 10°–30° F.

20 Claims, 2 Drawing Figures

METHOD OF DESULFURIZATION OF FLUE GASES

BACKGROUND OF THE INVENTION

All facilities which burn sulfur-containing fossil fuel to generate electric power, as well as sulfide roasting industries and many other industrial processes, emit sulfur-dioxide and smaller amounts of sulfur-trioxide in their waste gas streams. Although the concentration of sulfur-oxides in the waste gas is usually low, the total amount emitted annually is excessive. The emissions present a severe pollution problem and constitute a loss of a valuable natural resource.

The U.S. Environmental Protection Agency, under authority of the Clean Air Act, as amended, has issued standards which call for a substantial reduction in the amount of sulfur discharged to the atmosphere. Compliance with these emission standards may be attained by use of low-sulfur fuel, fuel desulfurization, and gasification processes to make a clean fuel; however, sufficient supplies of such fuels are not now available and may not be so for some time to come. The alternative is to remove the sulfur-dioxide from the waste gas streams.

Many processes for the removal alone and removal with recovery of sulfur-oxides from waste gas streams have been proposed (Sulfur-Oxide Removal from Power Plants Stack Gas, McGlamery, G. G. et al, Environmental Protection Technology Series, EPA report EPA-R2-73-244, May, 1973; Status of Stack Gas Technology for $SO_2$ Control EPRI report 209, part II, 1975; $SO_2$ Abatement For Stationary Sources in Japan ANDO, J. and ISSACS, G. A., Environmental Protection Technology Series, EPS report EPS-600/2-76-013a, January, 1976; Flue Gas Desulfurization:An Overview, Slack, A. V., Chem. Eng. Progress 72,94–97, 1976). Absorbents such as slurries of metal oxides or hydroxides, aqueous solutions of ammonium and sodium salts, molten alkali salts, and solid absorbents such as sodiumaluminates and activated carbon have been evaluated. Of the many processes tested, most were effective in removing sulfur oxides from the waste gas streams but suffered from other defects such as poor economics, difficulty in regeneration of the absorbents, production of large quantities of a sulfur bearing waste product which posed difficult disposal problems, and process conditions which were too strigent to maintain in a commercial installation. Because of these difficulties, at present no process for the removal of sulfur-oxides from waste gas has been accepted on a wide scale by the electrical power industry or other commercial facilities.

It is convenient to divide desulfurization processes into two categories: throw-away processes and regenerative processes. In the former group, the sulfur is recovered from the stack gas in a form not amenable to recovery in a usable form. As the name implies, sulfur is recovered in the so-called regenerative processes in a salable form usually as sulfur, sulfur-dioxide or sulfuric acid.

Because throw-away processes require an inexpensive scrubbing agent, they are all based on calcidic limestone or lime. In limestone scrubbing, stack gas is washed with a recirculating slurry of calcite and reacted calcium salts. For highest removal efficiencies, a two-stage scrubber system, consisting of a Venturi and mobile bed scrubber is used to remove both particulate matter and gaseous sulfur-oxides. In this process, sulfur dioxide dissolves in water to yield a mixture of sulfite, bisulfite and hydronium ions. Limestone simultaneously dissolves in the scrubbing liquor and calcium and sulfite ions subsequently react to yield solid calcium, sulfite hemihydrate. Part of the sulfite ions also oxidizes to ultimately yield gypsum.

To gain additional sulfur-dioxide removal efficiency, lime may be substituted for limestone as a scrubbing agent. In making this substitution, the reaction velocity is increased but the final throw-away products are still calcium sulfite hemihydrate and gypsum.

In spite of the apparent simplicity of such systems, there are substantial operating difficulties. The circulating limestone slurry is erosive, particularly at high circulation rates. This potential for erosion necessitates the use of rubber lining in central areas of the scrubbing system, thus increasing capital costs. Solid deposits on process equipment is another major deterrent to successful operation of limestone or lime slurry processes. Much research and development has been lavished on this problem, but it can be eliminated only by meticulous attention to operating details (Borg Wardt, R.H., EPA/RTP pilot studies related to unsaturated operation of lime and limestone scrubbers, p.225, EPA/650/2-74-126a, 1974).

Another non-regenerative or throw-away process is the double-alkali process. In this process, sodium sulfite is substituted for lime or limestone as the scrubbing agent. During the scrubbing, sulfur-dioxide converts sodium sulfite to sodium bisulfite and the spent sulfite liquor is regenerated by contacting it with lime.

Similar reactions are possible with limestone. The insoluble calcium sulfite along with some calcium sulfate formed by oxidation is separated from the solution by settling and decantation. Sodium lost in this operation is replaced with sodium carbonate. The double alkali process is similar to lime or limestone scrubbing processes in that the sulfur-dioxide and a calcium base are converted to calcium sulfite and calcium sulfate.

By separating the scrubbing and regeneration steps, calcium utilization is increased and scaling problems are greatly reduced. These advantages are achieved at the expense of replenishing losses in the scrubbing liquor with relatively expensive sodium carbonate.

In the non-regenerative or throw-away processes, the final throw-away product is a thixotropic sludge comprised of fly ash, unreacted limestone or lime, calcium sulfite hemihydrate, gypsum and unreacted dolomite.

Partly because of the waste disposal problems associated with throw-away processes, numerous regenerative methods of flue gas desulfurization have been developed. Ammonium scrubbing, magnesia scrubbing, sodium scrubbing (Wellman-Lord process), and citrate scrubbing are among some of the more important of the many proposed desulfurization processes.

Ammonium scrubbing is a process which showed great promise and was extensively tested by the Tennessee Valley Authority for several years but was finally abandoned because an environmentally and esthetically objectionable plume formed when the scrubber-off gas contacted the atmosphere. No economically feasible method of eliminating the plume was developed and the process has fallen into disfavor.

Magnesia scrubbing with sulfur recovery is a stack gas scrubbing method under which also has been given considerable study. At least three major technological routes have been followed. American, Japanese, and Russian workers concentrated on the use of magnesium sulfite-magnesium oxide slurries. The Grillo Werks A.G. adds $MnO_2$ to the magnesium slurry to increase sulfur dioxide absorption efficiency. Some paper mills use an acidic clear liquor of magnesium sulfite and bisulfite to simultaneously remove particulate matter and absorb sodium sulfur-dioxide in a single scrubber. Of these variations, the basic $MgO$—$MgSO_3$ slurry process is the most advanced.

It uses two scrubbers in series; the first scrubber uses water to remove particulate matter and sulfur-trioxide and the sulfur-dioxide is removed in the second scrubber. Magnesium sulfite and magnesium sulfate are precipitated and recovered and these crystals are calcined between 800° and 1100° C. in the presence of coke or a reducing atmosphere to regenerate MgO and to expel $SO_2$. A major disadvantage of this process is the high temperature calcination of the magnesium sulfite and magnesium sulfate. This step is energy intensive and will become more costly as the cost of fuel increases.

Sodium scrubbing with sulfur recovering (Wellman-Lord) is another process under extensive study. As in the double alkali process, a sodium sulfite solution scrubs sulfur-dioxide from the flue gas. The spent bisulfite-rich scrubbing liquor is decomposed by steam stripping to regenerate sodium sulfite and to expel sulfur-dioxide. The sulfur-dioxide is recovered as product and the sodium-sulfite is returned to the process. Oxidation of the sulfur-dioxide and formation of sodium-sulfate occurs in the process as would be expected. To control the sodium sulfate level in the scrubbing solution a side stream is removed and sent to a purge treatment section where the sodium sulfate is crystallized and removed. The mother liquor is returned to the process and the sodium removed as sodium sulfate is replaced with sodium carbonate.

Oxidation is the greatest problem associated with the process because it leads to the consumption of sodium carbonate to produce sodium sulfate which has relatively little value. This oxidation may be partially suppressed with inhibitors such as para-phenylenediamine but the cost of the inhibitors adds appreciably to the operating costs.

The citric acid process, developed by the U.S. Bureau of Mines, uses a mixture of citric acid, sodium citrate, and sodium bisulfate to scrub sulfur dioxide from particulate-free gas streams.

The process comprises the following steps:

1. Particulate matter and sulfuric acid mist are removed from a cooled gas stream (45° to 65° C.).
2. A sodium citrate, citric acid and sodium thiosulfate mixture scrubs $SO_2$ from the cooled gas stream.
3. The spent scrubbing solution is regenerated by a reaction with hydrogen sulfide at 65° C. to yield elemental sulfur.
4. Sodium sulfate, an oxidation product, is crystallized from a slipstream by cooling.
5. The sulfur product is removed from the regenerated scrubbing solution by oil flotation and fusion.
6. Hydrogen sulfide is manufactured by reacting ⅔ of the recovered sulfur with steam and natural gas.

Two problems immediately stand out in this otherwise interesting process. The disposal of sodium sulfate may pose problems and, more seriously, the use of natural gas for hydrogen sulfide production is unattractive.

In my prior U.S. Pat. No. 4,189,309, a system and method of desulfurization of flue gas is disclosed wherein the flue gas is first scrubbed with water and is then cooled to a temperature in the range 40°–125° F. in a secondary cooler. This secondary cooler is of the indirect heat exchange type, requires a substantial quantity of cooling water flow, and represents approximately 25% of the total cost of the system. Thus, it would be desirable to eliminate or at least reduce the size and cost of the secondary cooling stage if possible.

The difficulty, however, is that the secondary cooling stage is necessary to reduce the temperature of the flue gas to a sufficiently low value so that the water in the next following stage, the absorber, may absorb a significant fraction of the $SO_2$ from the cooled flue gas and thereby maintain the size of the closed absorber/desorber system within reasonable limits. Moreover, my prior system is a balanced system in that the temperature $T_3$ to which the gas is cooled by the secondary cooler, the temperature $T_4$ of the water leaving the absorber and the temperature $T_5$ of the water leaving the desorber (evaporator) are closely interdependent as is illustrated in FIG. 4 of my prior patent.

A system of the type discribed above is to be distinguished from historically older systems (see U.K. patent specification 1427 of 1883 to Ramsey) which employ alkali or alkali-based aqueous absorbing liquors to absorb $SO_2$ with subsequent heating to effect recovery of the $SO_2$. These systems, in general, effect absorption of $SO_2$ at relatively high temperatures and consequently require liquor additives which will significantly reduce the vapor pressure of $SO_2$ over the liquor solution at these temperatures. Thus, citing the aforesaid Ramsey U.K. patent, H. F. Johnstone reported data concerning equilibrium partial vapor pressures over solutions of ammonia-sulfur dioxide-water systems *In Recovery of Sulfur-Dioxide from Waste Gases,* Industrial and Engineering Chemistry (1935) Vol. 27, pages 587–593.

In a later article having the same title [Industrial and Engineering Chemistry (1938), Vol. 30, pages 101–109], Johnstone, H. J. Read and H. C. Blankmeyer reported additional data concerning partial vapor pressures over other solutions.

The Clark U.S. Pat. No. 1,908,731 of May 16, 1933 is a similar type of system using an aqueous solution of alkali hydroxides or alkali sulfites with the addition of a salt in weak base and a strong acid, e.g., aluminum chloride which increases the recovery of $SO_2$ on regeneration at elevated temperatures.

The Bottoms U.S. Pat. No. 1,834,016 of Dec. 1, 1931 is a similar system using a certain organic ammonium compounds as the absorbing liquid and similar system are disclosed in the Bottoms U.S. Pat. No. 1,783,901 of Dec. 2, 1930 and its reissue U.S. Pat. No. Re. 18,958 of Sep. 26, 1933.

It is noteworthy that all of these systems, especially in those where an aqueous absorbing liquor is used, the liquor is a strong solution of the additive and the regeneration step always involves supplying heat with or without pressure reduction to regenerate the absorbing liquor.

BRIEF SUMMARY OF THE INVENTION

The present invention is directed to a closed system of the regenerative type wherein preliminary contact cooling of the flue gas is effected, followed optionally by secondary stage cooling and the use of a closed cycle system for absorbing $SO_2$ from the flue gas. The closed cycle system includes an absorber followed by a multi-stage vacuum desorber with the circulating mother liquor comprising a dilute aqueous solution preferably of calcium and/or magnesium ions. The absorbing liquor contains less than 1% of the alkaline ion and heat balance is maintained in the system such that the heat given up by the flue gas in the absorber is substantially equal to the heat content of the vapor removed from the desorber while the temperature difference between the liquor on entering and leaving the desorber is in the order of about 10°-30° F.

I have found that if the partial pressure of $SO_2$ in the absorbing liquid, at the equilibrium conditions of the liquid leaving the absorber is made equivalent to the partial pressure of $SO_2$ in water at a temperature in the range of about 15° C. to about −20° C., it is just possible to balance the temperature and BTU values of the system such that the secondary cooling apparatus of my prior patent may be eliminated or at least substantially reduced in size and capacity. This renders that system much more cost effective. I have also found that the use of additive as above also permits of a reduction in the size of the closed cycle absorbing/desorbing system and, correspondingly, to reduce the relative amount of steam required for stripping.

BRIEF DESCRIPTION OF THE DRAWING FIGURES

DETAILED DESCRIPTION OF THE INVENTION

Figure 1:
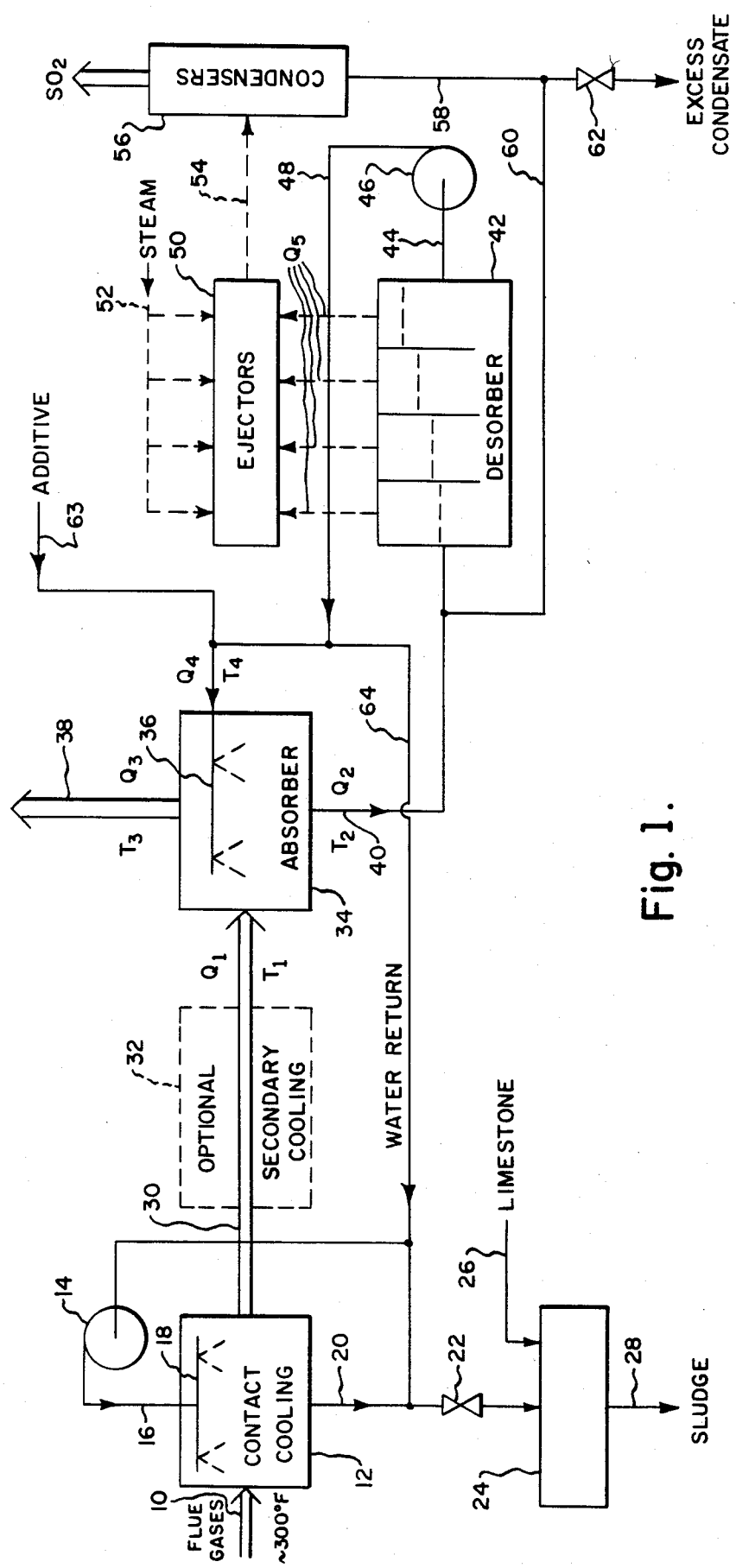
FIG. 1 is a block diagram showing the system of my invention.
Figure 2:
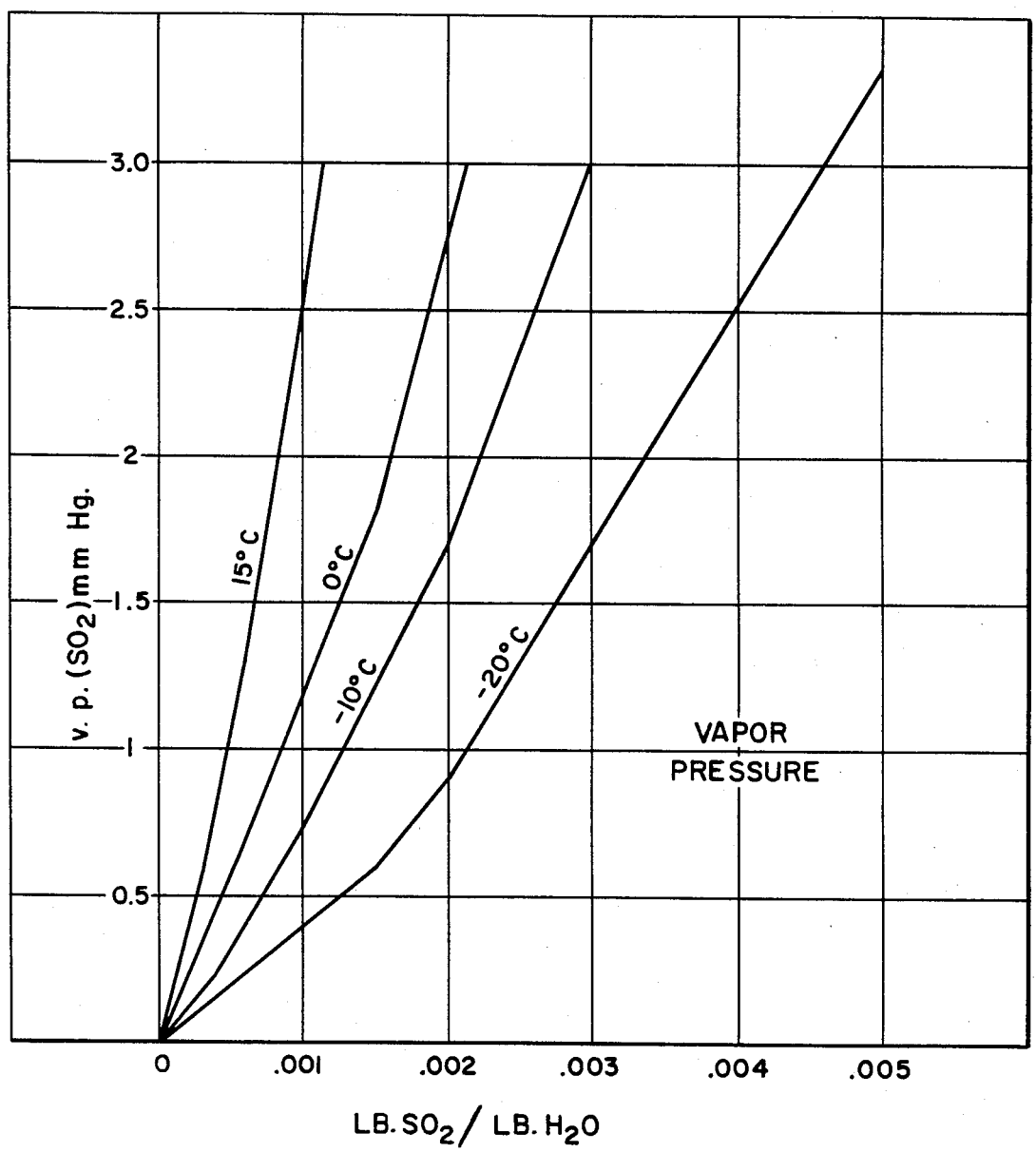
FIG. 2 is a graph of the partial pressure of $SO_2$ in water in the temperature range used for my invention.

FIG. 1 illustrates apparatus for carrying out the method according to the present invention and which will be seen to be generally similar to the apparatus shown in FIGS. 1 and 2 of my aforesaid prior U.S. Pat. No. 4,189,309. As shown, the flue gases indicated at 10 enter the system at a temperature of about 300° F. where they are subjected to contact cooling at 12 through the intermediary of a closed cycle system including the pump 14, the inlet line 16 which leads to the water spraying apparatus 18 as shown and the outlet line 20 which is returned to the inlet side of the pump 14. A valve 22 is provided for periodically purging the system to bleed the circulating liquid to the sump 24 wherein it is mixed with limestone as indicated at 26 to produce the sludge which is discharged at 28. This stage of the cooling of the flue gases removes particulates and sulfur-trioxide as is described in my aforesaid prior patent.

The flue gases exiting from the contact cooling stage at 30 may be additionally cooled as indicated at 32 although if required, the secondary optional cooling will be of minimal capacity and will not, as in my aforesaid prior patent, be required to be of very large capacity to effect significant cooling of the exit stream 30 of flue gases.

With or without secondary cooling, the flue gases enter the absorber 34 at a temperature $T_1$ and having a heat value of $Q_1$, as indicated. The absorption/desorption system is again a closed cycle system in which the absorbing liquor is contacted with the entering flue gas by means of the spray apparatus 36 as shown so that the cleansed flue gases exit at 38 at a temperature $T_3$ and having a heat value $Q_3$ as indicated. The liquor exits the absorber at the line 40 at a temperature $T_2$ and having a heat quantity value $Q_2$ and is applied to the desorber 42 wherein it is subjected to multi-stage vacuum stripping of water vapor and $SO_2$, as indicated, the heat content of the vacuum stripped vapor being $Q_5$ as indicated. Multi-stage vacuum is commonly practiced where large temperature drops occur in the circulating stream. The regenerated absorbing liquor is directed by the line 44 to the inlet of the pump 46 where it is returned at the line 48 to the spray head 36, the regenerated liquor entering the absorber at the temperature $T_4$ and having a heat value $Q_4$ as indicated.

The steam line for the ejectors 50 is indicated at 52 and the steam plus the stripped vapor exits at the line 54 which is directed to the condensors 56 which delivers condensate back to the desorber inlet through the line 58,60, the valve 62 being provided periodically to bleed excess condensate from the system.

The additive is shown entering at the line 63 whereby it is introduced at a point which passes directly to the absorber. The addition is continuous and may, for example, be in the form of powdered limestone or dolomite. Alternatively, the stream passing from the pump 46 to the sprayer 36 may be passed through a bed of the additive. In any event, some of the additive is continuously consumed because part of it is passed over the water return line 64 to the contact cooling stage where some of the calcium sulphite ions are converted to calcium sulfate which is ultimately purged at 22. The water return line 64 is essential because water in the closed cycle passed to the contact cooling stage 12 is constantly being evaporated and carried over to the absorber 34 where it is condensed. Thus, water balance between the contact cooling stage and the absorber/desorber stage is maintained over the water return line 64.

FIG. 2 is a graph in which the abscissa is pounds of $SO_2$ per pound of water and the ordinate is the vapor pressure of $SO_2$ in millimeters of mercury. The curves are the values of 15° C., 0° C.-10° C. and −20° C. As noted earlier, I have found that dilute solutions of, preferably, calcium ions (i.e., from limestone or dolomite) are effective to reduce the partial pressure of $SO_2$, at the outlet temperature $T_2$ of the absorber to values equivalent to the partial pressure of $SO_2$ in water at temperature in the range of 15° C. to −20° C. The particular concentration of additive will of course depend somewhat upon the temperature $T_2$, i.e., the higher the value of $T_2$, the higher will be the concetration of additive necessary to decrease the vapor pressure of $SO_2$ to that corresponding to a particular curve in FIG. 2.

It will be understood that although calcium carbonate in the form of limestone or dolomite is the preferred additive of this invention because of economics, other and different additives could also be used. For example, sodium and potassium salts, methylamine, ethanolamines, urea, aniline and ammonia are other alkaline materials which are representative of additives which can be used.

What is claimed is:

1. The method of significantly reducing the sulfur oxides content of flue gases, which comprises the steps of:
    (a) cooling the flue gases to a temperature in the order of about 125° F. while removing particulates and sulfur-trioxides therefrom;
    (b) absorbing a major part of the $SO_2$ content of the cooled flue gases by circulating, in a closed system, an absorbing liquid which is contacted with the flue gases to effect the absorption of $SO_2$, said absorbing liquid being a dilute solution in water of an additive capable of decreasing the partial pressure of $SO_2$ in the liquid at a temperature of the liquid leaving the absorber which is equivalent to the partial pressure of $SO_2$ in water at a temperature in the range of about 15° C. to about −20° C;

(c) desorbing $SO_2$ from the absorbing liquid by subjecting the liquid to multi-stage vacuum stripping;

(d) condensing the steam and vapor stripped in step (c) to recover $SO_2$; and (e) controlling the flow rate of absorbing liquid in said closed system and the rate of desorption of step (c) such that the quantity of heat removed by stripping is substantially equal to the heat given up by the flue gases in step (b) while the temperature difference between the absorbing liquid before and after absorption of $SO_2$ is in the order of 10°–30° F.

2. The method as defined in claim 1 wherein the additive is an alkaline metal salt and the absorbing liquid contains less than 1% of ionized electrolyte ions in solution.

3. The method as defined in claim 2 wherein the additive is limestone or dolomite.

4. The method as defined in claim 1 wherein the additive is limestone or dolomite.

5. The method as defined in claim 1 wherein the temperature of the flue gases exiting the absorber is in the order of 95° F.

6. The method as defined in claim 5 wherein the additive is an alkaline metal salt and the absorbing liquid contains less than 1% of ionized electrolyte ions in solution.

7. The method as defined in claim 6 wherein the additive is limestone or dolomite.

8. The method as defined in claim 5 wherein the additive is limestone or dolomite.

9. The method as defined in claim 1 wherein the temperature of the absorbing liquid leaving the desorber is in the order of 85° F.

10. The method as defined in claim 9 wherein the additive is an alkaline metal salt and the absorbing liquid contains less than 1% of ionized electrolyte ions in solution.

11. The method as defined in claim 9 wherein the additive is limestone or dolomite.

12. The method as defined in claim 11 wherein the additive is limestone or dolomite.

13. The method as defined in claim 9 wherein the temperature of the flue gases exiting the absorber is in the order of 95° F.

14. The method as defined in claim 13 wherein the additive is an alkaline metal salt and the absorbing liquid contains less than 1% of ionized electrolyte ions in solution.

15. The method as defined in claim 13 wherein the additive is limestone or dolomite.

16. The method as defined in claim 15 wherein the additive is limestone or dolomite.

17. The method of significantly reducing the sulfur oxides content of flue gases, which comprises the steps of:

(a) cooling the flue gases while removing particulates and sulfur-trioxides therefrom;

(b) absorbing a major part of the $SO_2$ content of the cooled flue gases by circulating, in a closed system, an absorbing liquid which is contacted with the flue gases to effect the absorption of $SO_2$, said absorbing liquid being a dilute solution in water of an additive capable of decreasing the partial pressure of $SO_2$ in the liquid at the temperature of the liquid leaving the absorber which is equivalent to the partial pressure of $SO_2$ in water at a temperature in the range of about 15° C. to about −20° C.;

(c) desorbing $SO_2$ from the absorbing liquid by subjecting the liquid to multi-stage vacuum stripping;

(d) condensing the steam and vapor stripped in step (c) to recover $SO_2$; and (e) controlling the flow rate of absorbing liquid in said closed system and the rate of desorption of step (c) such that the quantity of heat removed by stripping is substantially equal to the heat given up by the flue gases in step (b) while the temperature difference between the absorbing liquid before and after absorption of $SO_2$ is in the order of about 10°–30° F.

18. The method as defined in claim 17 wherein the additive is an alkaline metal salt and the absorbing liquid contains less than 1% of ionized electrolyte ions in solution.

19. The method as defined in claim 18 wherein the additive is limestone or dolomite.

20. The method as defined in claim 17 wherein the additive is limestone or dolomite.

* * * * *